Figure 1:
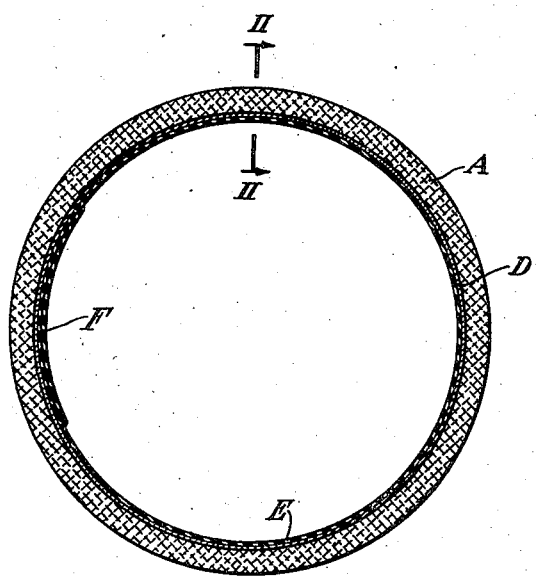

Jan. 15, 1946.    M. BALKIN    2,392,967
HOSE AND MANUFACTURE THEREOF
Filed Jan. 7, 1941

Mark Balkin
By
Watson, Cole, Grindle & Watson
Attys

UNITED STATES PATENT OFFICE 2,392,967

HOSE AND MANUFACTURE THEREOF

Mark Balkin, Bentham, England, assignor to The Sillick Holding Company Limited, Newcastle-upon-Tyne, England Application January 7, 1941, Serial No. 373,514
In Great Britain March 26, 1940

2 Claims. (Cl. 154—8)

Ordinary unlined textile fire and other hose is not entirely watertight initially, and although this defect greatly diminishes with absorption of water, it is always, to a small extent, porous. It has the further disadvantage that when wetted during use it tends to become stiff so that it cannot be coiled compactly before being dried.

Rubber lined fire hose is completely non-porous, and has the advantages that the fabric, not being wetted by percolation, does not become stiff in use, while the rubber lining lessens the internal resistance to flow. As an example, to illustrate the invention by comparison, ordinary rubber lined hose may be made by drawing a relatively thick rubber tube, coated with adhesive, through the hose, and afterwards passing steam into the hose to vulcanise the rubber lining and cause it to adhere firmly to the inner wall of the hose. Rubber lined hose is, however, much more costly than unlined hose to produce. It is also considerably heavier, and is difficult to coil compactly when either in the wet or dry condition.

The present invention has for its object to provide a non-porous and impervious hose which has the advantages of the rubber lined hose at present on the market, while decreasing the disadvantages of excessive cost and weight and lack of flexibility in coiling. By "non-porous" I mean a hose which is either completely non-porous, or nearly so.

The object is achieved, according to the invention, by providing the hose with an internal non-porous but thin, flexible and light-weight lining of rubber or equivalent sealing agent. Such a thin lining would have insufficient strength to enable it to be drawn into a standard length of hose (e. g. 50–100 ft.), that is to say, a formed thin tube of rubber or other material equivalent thereto for the purposes of this invention, as described herein, of suitable diameter to serve as a lining, would tear or break or otherwise suffer damage if so drawn, if not reinforced or mounted on a carrier and the same result would follow if such tube were drawn a shorter distance through a textile-envelope-making machine, as is hereafter referred to. I accordingly apply the lining to a flexible carrier, which although light in weight, has sufficient strength to enable it to be drawn in tubular form through the hose to produce an internal lining therein, and will remain flexible when in position in the hose. I prefer to use fabric as the flexible carrier, but other materials may, of course, be used instead, for example cellulose compositions, flexible synthetic plastics, or paper, and the expression "fabric or the like" as used herein is to be understood as including such alternative materials. The sealing agent may be applied to the fabric or other carrier before or after the latter is made into tubular form. Also it might in some cases be advisable to use a carrier which is soluble in water or otherwise removable after having served the purpose of introducing the lining into the hose.

By the expression "equivalent sealing agent" I mean a material which, like rubber, can be applied to the carrier in liquid or plastic form, and will solidify to form a thin impervious coating thereon which is substantially unaffected by water, elastic and flexible. The following are examples of sealing agents which may be used: rubber latex, flexible chlorinated rubber compounds, synthetic rubber, cellulose compositions such as cellulose acetate compositions, synthetic plastic compositions, and oilskin compositions, all of which must be flexible and elastic, and substantially resistant to water. Rubber latex, among the various sealing agents which may be used, has particular advantageous properties for the desired purpose, as will be explained hereafter. Although these sealing agents are capable of application to the carrier in liquid or plastic form it may, in some cases, be more convenient to apply them in the form of a thin solid sheet.

The proofed fabric, or other flexible material, is introduced into the hose, and caused to adhere thereto by the application of internal or external pressure, an adhesive having been applied, if necessary (i. e. if the sealing agent is not itself used as the adhesive), to the surface of the fabric which contacts with the inner wall of the hose.

If rubber is used as the sealing agent, then this may be applied to the fabric as thin rubber sheet, as rubber latex or in the form of rubber solution, and if the rubber is still in a tacky condition, no additional adhesive may be required. Alternatively, rubberised cloth, as sold on the market, may be used, coated, if required, with a suitable adhesive. After forming the rubber coated fabric into a tube, it is drawn through the hose and caused to adhere to it, either by applying internal pneumatic, steam or hydraulic pressure, or by squeezing the hose between rollers, or in any other suitable way. The rubber coating may be on both sides of the textile material or may form, if on one side only, the inside or outside of the inner lining tube. It is desirable that the fabric lining should adhere to the hose over the whole surface of contact, though this is not essential. The rubber may be either vulcanised or unvulcanised.

As an alternative to introducing the rubbered fabric into a previously manufactured hose, it may be introduced continuously into an outer textile envelope during the manufacture of the latter. For example it may, in the case of hose woven on a circular loom, be incorporated during the weaving operation, a tube of fabric with, for example, an external coating of rubber being drawn through the machine and caused to adhere to the hose as the latter is woven, the adhesion being effected by the rollers which draw off the hose from the loom. This method may be applied with advantage where the weft yarn is coated with rubber latex as described in application Serial No. 369,893, filed December 12, 1940, Patent No. 2,353,387 dated July 11, 1944, since the latex which penetrates to the interior of the hose will assist in causing adhesion of the lining to the hose. It may be noted that the thin latex coating on the fabric carrier has so little strength in itself that, if formed into a tube without a carrier or reinforcement, it would tear or break if drawn through the machine by the drawing-off rollers referred to.

Hose pipes provided with a thin rubber lining in accordance with the invention are very light, are only slightly more expensive to manufacture than ordinary hose pipes, are completely non-porous or almost so and can easily be coiled, wet or dry. Moreover, the effect of the rubber lining in eliminating porosity, enables the outer envelope to be fabricated of yarn of less high quality than is necessary for unlined fire hose if this is desired.

Figure 2:
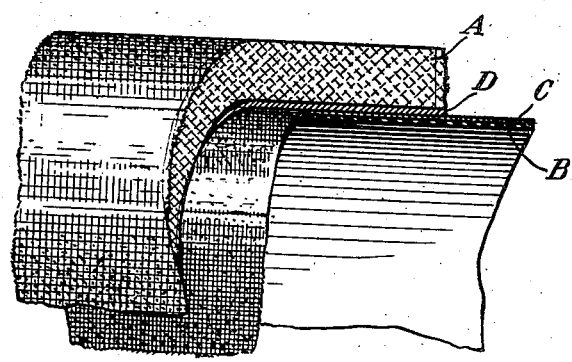

In the accompanying drawing is shown one form of non-porous fire hose according to the invention, Figure 1 being a cross section of the hose on an enlarged scale, and Figure 2 being an enlarged section, partly broken away, on the line II—II in Figure 1.

The hose consists of an outer canvas envelope A about 2.5 mm. in thickness. The thin rubber lining B (see Fig. 2) is applied to the inner face of a tubular cloth carrier C attached to the outer envelope A by means of a layer D of cement. In Figure 1 the rubber proofed cloth is indicated by the letter E, since the scale is insufficiently large to show the cloth and the rubber separately. The method adopted for the manufacture of the hose was as follows:

The cloth used to form the carrier C was a cotton cloth having a thickness of approximately .12 mm. This was drawn through rubber latex and thus made to carry a rubber film of approximate thickness .18 mm. on one surface with a very much thinner film on the other surface. The cloth was then formed into a tube having an overlap joint F and having the thicker film of rubber latex on its inner surface, the tube being formed when the rubber latex was sufficiently dry but still tacky enough to enable it to act as the jointing medium at the overlap joint. The tube was then vulcanised in a hot chamber and subsequently passed through a bath containing a suitable cement, the bath being fitted with strickling knives to reduce the thickness of the cement layer to approximately .2 mm. After the solvent had dried off from the cement, the proofed cloth tube was drawn into the canvas envelope, and one end was coupled to a steam pipe and the other to a blank end fitting. Steam under pressure was then passed through the hose, thus heating the cement and causing adhesion of the tubular insert of proofed cloth to the interior surface of the canvas envelope.

In the hose so manufactured, the complete lining, consisting of the layers of rubber, cloth and cement, has a thickness (.5 mm.) which is very considerably less than that of the canvas envelope (2.5 mm.). It will be understood that this is a product very different from the rubber lined hose at present on the market in which the thickness of the complete lining (i. e. rubber plus cement) approximates to that of the textile envelope. It will further be noted from the above example that the coating layer or layers may be of a thickness of about .2 to .3 mm. (say, of the order of .01 inch) while the complete lining may be, roughly, about double this thickness.

While it is preferred, as described above, to cause the lining to adhere to the outer textile envelope, it may in some cases be sufficient to leave the lining loose in the outer envelope and held in position only by the couplings at the ends of the length of hose.

It may further be noted that the extremely thin flexible lining such as is described herein, with particular reference to the example given, which is of insufficient strength to enable the same to be drawn into a standard length of fire hose, when without carrier or reinforcement, will remain substantially impervious when the hose carries water pressures up to 400 lbs. per square inch. It may further be remarked that, while the usual thick rubber linings previously used tend to crack at the selvedges under repeated coiling after use, or when kept coiled in storage, the thin flexible linings herein described will continue to fold flat along the same lines, when coiled after use, without cracking and without the need of special selvedge reinforcement. This is because the tendency of a rubber film to crack is a function of its quality and the angle round which it is bent relative to its thickness. To coil a hose flat the selvedge of the outer cover must be folded as flat as possible and the lining at the edge must follow as nearly as possible the contours of the inside of the cover when thus bent. The thinner the lining the less the strains imposed by bending to this angle and the less the tendency to crack. This cracking is likely to take place as the rubber ages, so that the thin linings suggested enhance the life of the hose.

The following further observations may also be made. The use of the thin flexible carrier not only enables the weak tubing of rubber or the like to be drawn into the textile envelope without tearing or dangerous stretching, it is of further importance since without it suitable tubing of the considerable length which is commercially desirable and the extreme thinness contemplated could be made only with great difficulty, if at all. Thus, if the tubing is made of rubber, either an extrusion method or the manufacture of unvulcanised sheets, which are folded over to make a tube, must be used, and technical difficulties are encountered with both if no carrier or backing is employed. The extrusion of such thin and wide diameter rubber tubing would present special difficulties and would probably be unpractical, and, with the sheet method, the joint required when the sheet is tubed must be an extremely effective one to withstand considerable water pressure. The best joint (and perhaps the only one strong enough for effective use in fire hose) must be made while the rubber is still unvulcanised, and, if no backing were used, considerable difficulties would arise in removing the mandrel on which the joint was made, or in pulling the unvulcanised tube past the mandrel, without damage to the tube. Also, in the unvulcanised condition such thin sheet would be soft, sticky and plastic and easily distorted, and would be extremely difficult to handle in roll form or in lengths suitable for production.

What I claim as my invention and desire to secure by Letters Patent is:

1. The method of producing impervious textile hose, which comprises, forming a coating of thin continuous film of rubber latex on a sheet of thin textile fabric of vegetable fibres by drawing the fabric through latex, forming said coated sheet into tubing, having an overlapped joint, the latex being utilised as the jointing medium, said coated tubing being sufficiently strong to enable it to be drawn without damage thereto through a fifty foot length of a relatively thick textile envelope of internal diameter slightly larger than the exterior diameter of said tubing, and said latex coating being of the order of .01 inch in total thickness and therefore so thin that if produced as tubing without a carrier or reinforcement it would have insufficient strength to enable it, without damage, to be drawn through a fifty foot length of said envelope, drawing said coated tubing into said envelope, and vulcanising and causing it to adhere in position within said envelope.

2. The method of producing impervious textile hose, which comprises, producing the outer textile envelope of the hose on a suitable machine, producing tubing of thin flexible fabric having a continuous thin coating of rubber latex on a surface thereof, said coated tubing being sufficiently strong to enable it to be drawn without damage thereto through a fifty foot length of a relatively thick textile envelope of internal diameter slightly larger than the exterior diameter of said tubing, introducing said coated tubing into the interior of said textile envelope during the production of the latter, drawing the envelope off the machine continuously, and the coated tubing within the same therewith, by suitably positioned rollers, and causing adhesion between said coated tubing and envelope by the pressure of said rollers, the latex coating on said tubing being so thin that if produced as tubing without a carrier or reinforcement it would have insufficient strength to enable it without substantial damage to be drawn through the envelope making machine by said rollers.

MARK BALKIN.